(12) United States Patent
Meredith et al.

(10) Patent No.: US 10,085,270 B2
(45) Date of Patent: *Sep. 25, 2018

(54) SELECTION OF A RADIO ACCESS TECHNOLOGY RESOURCE BASED ON RADIO ACCESS TECHNOLOGY RESOURCE HISTORICAL INFORMATION

(71) Applicant: AT&T Mobility II LLC, Atlanta, GA (US)

(72) Inventors: Sheldon Meredith, Marietta, GA (US); Mark Austin, Roswell, GA (US); Jeremy Fix, Acworth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,468

(22) Filed: Nov. 4, 2016

(65) Prior Publication Data

US 2017/0079045 A1 Mar. 16, 2017

Related U.S. Application Data

(63) Continuation of application No. 14/952,609, filed on Nov. 25, 2015, now Pat. No. 9,510,355, which is a (Continued)

(51) Int. Cl.
*H04W 72/06* (2009.01)
*H04W 64/00* (2009.01)
(Continued)

(52) U.S. Cl.
CPC .......... *H04W 72/06* (2013.01); *H04W 48/18* (2013.01); *H04W 52/0229* (2013.01);
(Continued)

(58) Field of Classification Search
CPC . H04W 72/06; H04W 72/02; H04W 52/0229; H04W 64/006; H04W 48/18; H04W 88/06; H04W 64/00; Y02B 60/50
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Office Action dated Jun. 12, 2017 for U.S. Appl. No. 15/132,220, 25 pages.

(Continued)

*Primary Examiner* — Joseph Dean, Jr.
(74) *Attorney, Agent, or Firm* — Amin, Turocy & Watson, LLP

(57) ABSTRACT

The disclosed subject matter provides for selecting a radio access technology resource based on historical data related to the radio access technology resource. Location information can be employed to determine a radio access technology resource. Historical information related to the radio access technology resource can then be employed to determine the suitability of the radio access technology resource. A set of radio access technology resources can be ordered or ranked to allow selection of a suitable radio access technology resource from the set. Incorporation of historical information can provide for additional metrics in the selection of a radio access technology resource over simple contemporaneous radio access technology resource information. In (Continued)

some embodiments, timed fingerprint location (TFL) information can be employed to determine a location.

20 Claims, 11 Drawing Sheets

Related U.S. Application Data continuation of application No. 14/521,431, filed on Oct. 22, 2014, now Pat. No. 9,232,525, which is a continuation of application No. 13/188,300, filed on Jul. 21, 2011, now Pat. No. 8,897,802.

(51) Int. Cl.
*H04W 52/02* (2009.01)
*H04W 48/18* (2009.01)
*H04W 88/06* (2009.01)
*H04W 72/02* (2009.01)

(52) U.S. Cl.
CPC ......... *H04W 64/006* (2013.01); *H04W 72/02* (2013.01); *H04W 64/00* (2013.01); *H04W 88/06* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/23* (2018.01); *Y02D 70/26* (2018.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brookel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Komeluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B2 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |

(56) References Cited

U.S. PATENT DOCUMENTS

| | | |
|---|---|---|
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,008,684 B2 | 4/2015 | Tipton et al. |
| 9,008,698 B2 | 4/2015 | Meredith et al. |
| 9,232,399 B2 | 1/2016 | Tipton et al. |
| 9,667,660 B2 | 5/2017 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Dud et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Lampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1* | 1/2009 | Sachs .................. H04W 36/14 455/437 |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |

(56) References Cited

U.S. PATENT DOCUMENTS

| | | |
|---|---|---|
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0226451 A1 | 8/2013 | O'Neill et al. |
| 2013/0267242 A1 | 10/2013 | Curticapean et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Notice of Allowance dated May 8, 2017 for U.S. Appl. No. 15/466,853, 18 pages.

Notice of Allowance dated May 19, 2017 for U.S. Appl. No. 15/261,841, 83 pages.

Office Action dated Jun. 19, 2017 for U.S. Appl. No. 13/447,072, 47 pages.

Office Action dated Jul. 5, 2017 for U.S. Appl. No. 15/191,877, 32 pages.

Office Action dated Jul. 25, 2017 for U.S. Appl. No. 15/422,147, 86 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

Cortes, et al. "Support-Vector Networks", Machine Learning, 20, 1995. http://www.springerlink.com/content/k38jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last

(56) References Cited

OTHER PUBLICATIONS updated: Apr. 15, 2010.http://www.csie.ntu.edu.tw/~cjlin/papers/guide/guide.pdf. Last accessed Dec. 24, 2010, 16 pages.
Drucker, et al. Support Vector Regression Machines.http://scholar.google.com/scholar?q=%22Support+Vector+Regression+Machines.%22. Last accessed Dec. 24, 2010, 7 pages.
Suykens, et al., "Least squares support vector machine classifiers", Neural Processing Letters, vol. 9, No. 3, Jun. 1999, pp. 293-300.
Ferris, et al. (2002). "Interior-point methods for massive support vector machines". SIAM Journal on Optimization 13: 783-804. doi:10.1137/S1052623400374379.
Meyer, et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011, 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rtz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarrier.com/technology, retrieved on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework, dated Jan. 10, 2010, 17 pages.
Office Action for U.S. Appl. No. 12/836,471 dated Dec. 28, 2011, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobiLutions Introduces MobiLoc—A Breakthrough Technology to Control Texting in the Mobile Workplace. Press release Oct. 10, 2010 by MobiLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 18, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Office Action dated Jan. 25, 2013, for U.S. Appl. No. 13/554,285, 20 pages.
Office Action dated Mar. 19, 2013, for U.S. Appl. No. 13/174,541, 46 pgs.
Office Action dated Feb. 13, 2013, for U.S. Appl. No. 13/220,083, 48 pgs.
Office Action dated Feb. 22, 2013, for U.S. Appl. No. 13/188,345, 45 pgs.
Office Action dated Mar. 15, 2013, for U.S. Appl. No. 13/204,535, 18 pgs.
Office Action dated Mar. 19, 2013, for U.S. Appl. No. 13/284,497, 46 pgs.
Office Action dated Apr. 19, 2013, for U.S. Appl. No. 13/277,595, 58 pages.
Notice of Allowance dated Aug. 12, 2013, for U.S. Appl. No. 13/174,541, 40 pages.
Office Action dated Aug. 2, 2013, for U.S. Appl. No. 13/188,295, 26 pages.
Office Action dated Aug. 2, 2013, for U.S. Appl. No. 13/188,300, 38 pages.
Office Action dated Jun. 20, 2013, for U.S. Appl. No. 13/219,911, 61 pages.
Office Action dated Jul. 17, 2013, for U.S. Appl. No. 13/188,345, 27 pages.
Office Action dated Jun. 20, 2013, for U.S. Appl. No. 13/291,917, 52 pages.
Office Action dated May 31, 2013, for U.S. Appl. No. 13/523,770, 40 pages.
Office Action dated Sep. 19, 2013, for U.S. Appl. No. 13/927,020, 30 pages.
Office Action dated Oct. 2, 2013 for U.S. Appl. No. 12/958,146, 31 pages.
Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Office Action dated Nov. 5, 2013 for U.S. Appl. No. 13/188,136, 47 pages.
Office Action dated Sep. 18, 2013, for U.S. Appl. No. 13/284,497, 30 pages.
Office Action dated Aug. 22, 2013, for U.S. Appl. No. 13/277,595, 36 pages.

(56) References Cited

OTHER PUBLICATIONS

Office Action dated Oct. 21, 2013, for U.S. Appl. No. 13/523,770, 24 pages.
Office Action dated Nov. 5, 2013 for U.S. Appl. No. 13/188,345, 30 pages.
Office Action dated Dec. 11, 2013, for U.S. Appl. No. 13/188,295, 52 pages.
Office Action dated Dec. 24, 2013, for U.S. Appl. No. 13/188,300, 44 pages.
Office Action dated Dec. 11, 2013, for U.S. Appl. No. 13/291,917, 34 pages.
Office Action dated Jan. 15, 2014 for U.S. Appl. No. 13/219,911, 38 pages.
Office Action dated Jan. 28, 2014, for U.S. Appl. No. 12/958,146, 24 pages.
Notice of Allowance dated Feb. 14, 2014 for U.S. Appl. No. 13/284,456, 30 pages.
Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in Wcdma Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN lu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In the American heritage dictionary of the English language. Retrieved on May 9, 2014 from http://search.credoreference.com/content/entry/hmdictenglang/represent/0.
Office Action dated May 20, 2014 for U.S. Appl. No. 13/551,369, 29 pages.
Office Action dated May 30, 2014 for U.S. Appl. No. 13/277,595, 49 pages.
Office Action dated Jun. 3, 2014 for U.S. Appl. No. 13/523,770, 53 pages.
Office Action dated Jun. 6, 2014 for U.S. Appl. No. 13/447,072, 25 pages.
Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.

(56) References Cited

OTHER PUBLICATIONS

Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
Office Action dated Sep. 30, 2016 for U.S. Appl. No. 14/957,525, 72 pages.
Notice of Allowance dated Oct. 7, 2016 for U.S. Appl. No. 14/548,901, 45 pages.
Office Action dated Oct. 12, 2016 for U.S. Appl. No. 14/877,915, 34 pages.
Notice of Allowance dated Nov. 16, 2016 for U.S. Appl. No. 15/186,410, 80 pages.
Office Action dated Dec. 28, 2016 for U.S. Appl. No. 13/447,072, 34 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance dated Jan. 21, 2015 for U.S. Appl. No. 13/495,391, 98 pages.
Notice of Allowance dated Feb. 6, 2015 for U.S. Appl. No. 13/204,535, 20 pages.
Office Action dated Feb. 13, 2015 for U.S. Appl. No. 14/516,286, 62 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning 8: Planning and Design, vol. 33, 2006, 23 pages.
Office Action dated Sep. 14, 2015 for U.S. Appl. No. 13/557,425, 32 pages.
Office Action dated Apr. 16, 2015 for U.S. Appl. No. 14/521,431, 82 Pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Ofiice Action dated May 20, 2015 for U.S. Appl. No. 13/526,988, 52 pages.
Office Action dated Jun. 19, 2015 for U.S. Appl. No. 13/495,756, 35 pages.
Notice of Allowance dated Ju. 8, 2015 for U.S. Appl. No. 14/548,901, 125 pages.
Buford, et al, "Location Privacy Enforcement in a Location-Based Services Platform," IEEE, 2009, 5 pages.
Phillips, Jr., et al., "Information Sharing and Security in Dynamic Coalitions," ACM, 2002, pp. 87-96, 10 pages.
Moniruzzaman, et al., "A Study of Privacy Policy Enforcement in Access Control Models", Proceedings of 13th International Conference on Computer and Information Technology IEEE, 2010, pp. 352-357, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/content/entry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Jan. 11, 2016 for U.S. Appl. No. 13/175,199, 29 pages.
Office Action dated Aug. 24, 2017 for U.S. Appl. No. 14/881,335, 125 pages.
Notice of Allowance dated Aug. 16, 2017 for U.S. Appl. No. 14/877,915, 63 pages.
Office Action dated Oct. 4, 2017 for U.S. Appl. No. 15/235,502, 80 pages.
Office Action dated Sep. 28, 2017 for U.S. Appl. No. 15/132,220, 29 pages.
Office Action dated Oct. 18, 2017 for U.S. Appl. No. 15/629,366, 131 pages.
Office Action dated Oct. 16, 2017 for U.S. Appl. No. 15/131,793, 84 pages.
Office Action dated Nov. 15, 2017 for U.S. Appl. No. 15/191,877, 30 pages.

(56) References Cited

OTHER PUBLICATIONS

Office Action dated Jan. 8, 2018 for U.S. Appl. No. 15/132,220, 30 pages.
Office Action dated Jan. 24, 2018 for U.S. Appl. No. 15/603,416, 99 pages.
Office Action dated Feb. 13, 2018 for U.S. Appl. No. 14/881,335, 54 pages.
Office Action dated Jan. 13, 2017 for U.S. Appl. No. 14/601,800, 95 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Office Action dated Feb. 27, 2017 for U.S. Appl. No. 15/132,220, 91 pages.
Notice of Allowance dated Apr. 10, 2017 for U.S. Appl. No. 14/676,066, 33 pages.
Office Action dated Mar. 30, 2018 for U.S. Appl. No. 15/235,502, 14 pages.
Office Action dated Mar. 27, 2018 for U.S. Appl. No. 15/629,366, 23 pages.
Office Action dated Jun. 13, 2018 for U.S. Appl. No. 15/191,877, 33 pages.
Office Action dated May 29, 2018 for U.S. Appl. No. 14/881,335, 63 pages.
Office Action dated May 2, 2018 for U.S. Appl. No. 14/704,949, 95 pages.
Office Action dated May 11, 2018 for U.S. Appl. No. 15/132,220, 29 pages.
Office Action dated May 30, 2018 for U.S. Appl. No. 15/629,366, 30 pages.
Office Action dated May 31, 2018 for U.S. Appl. No. 15/603,421, 90 pages.

* cited by examiner

SELECTION OF A RADIO ACCESS TECHNOLOGY RESOURCE BASED ON RADIO ACCESS TECHNOLOGY RESOURCE HISTORICAL INFORMATION

CROSS-REFERENCE TO RELATED APPLICATIONS

This application is a continuation of, and claims priority to each of, U.S. patent application Ser. No. 14/952,609, filed on 25 Nov. 2015, entitled "SELECTION OF A RADIO ACCESS TECHNOLOGY RESOURCE BASED ON RADIO ACCESS TECHNOLOGY RESOURCE HISTORICAL INFORMATION," which is a continuation of U.S. patent application Ser. No. 14/521,431, filed on 22 Oct. 2014, entitled "SELECTION OF A RADIO ACCESS TECHNOLOGY RESOURCE BASED ON RADIO ACCESS TECHNOLOGY RESOURCE HISTORICAL INFORMATION," now issued as U.S. Pat. No. 9,232,525, which is a continuation of U.S. patent application Ser. No. 13/188,300, filed on 21 Jul. 2011, entitled "SELECTION OF A RADIO ACCESS TECHNOLOGY RESOURCE BASED ON RADIO ACCESS TECHNOLOGY RESOURCE HISTORICAL INFORMATION," and now issued as U.S. Pat. No. 8,897,802, the entireties of each of which applications are hereby incorporated herein by reference.

TECHNICAL FIELD

The disclosed subject matter relates to selection of bearer resource technologies and, more particularly, to bearer resource technology selection through analysis of historical data associated with a bearer technology resource.

BACKGROUND

Conventionally, radio access technology (RAT) selection for user equipment (UE) can be based on the detection of an available RAT resource. RAT resources can be represented by different communications technologies as contrasted with radio access bearer resources, which can be different communications channels that can employ the same radio access technology. For example, a radio access bearer resource can be a first or second channel on Universal Mobile Telecommunications System (UMTS) radio access technology, while in contrast a radio access technology can be a UMTS technology, a Wi-Fi technology (e.g., IEEE 802.11 standard), a TDMS technology, etc. Radio access bearer handover can occur in conjunction with RAT selection such that connecting to a new bearer can additionally occur on a different radio access technology. RAT selection can thus be characterized by UEs scanning for available RAT resources. Scanning for RAT resources can require that corresponding radios in a UE be active to determine the presence of a RAT. Having a radio active in a UE can affect power consumption, and thus battery life, in a UE.

The conventional RAT selection process is also typically ignorant of historical information related to a RAT that can illuminate particular characteristics of potential RATs. For example, a UE can be actively scanning for a Bluetooth technology throughout the day, reducing the battery life of the UE, and can detect an available Bluetooth technology resource. The UE can then select the Bluetooth technology and begin connecting to the Bluetooth resource ignorant of historical information associated with the Bluetooth resource as being, for example, associated with particularly high radio interference that impedes effective use of the resource, the resource being associated with packet sniffing security intrusions experience by other users of the resource, etc.

The above-described deficiencies of conventional selection or RAT resources are merely intended to provide an overview of some of problems of current technology, and are not intended to be exhaustive. Other problems with the state of the art, and corresponding benefits of some of the various non-limiting embodiments described herein, may become further apparent upon review of the following detailed description.

DETAILED DESCRIPTION

Figure 1:
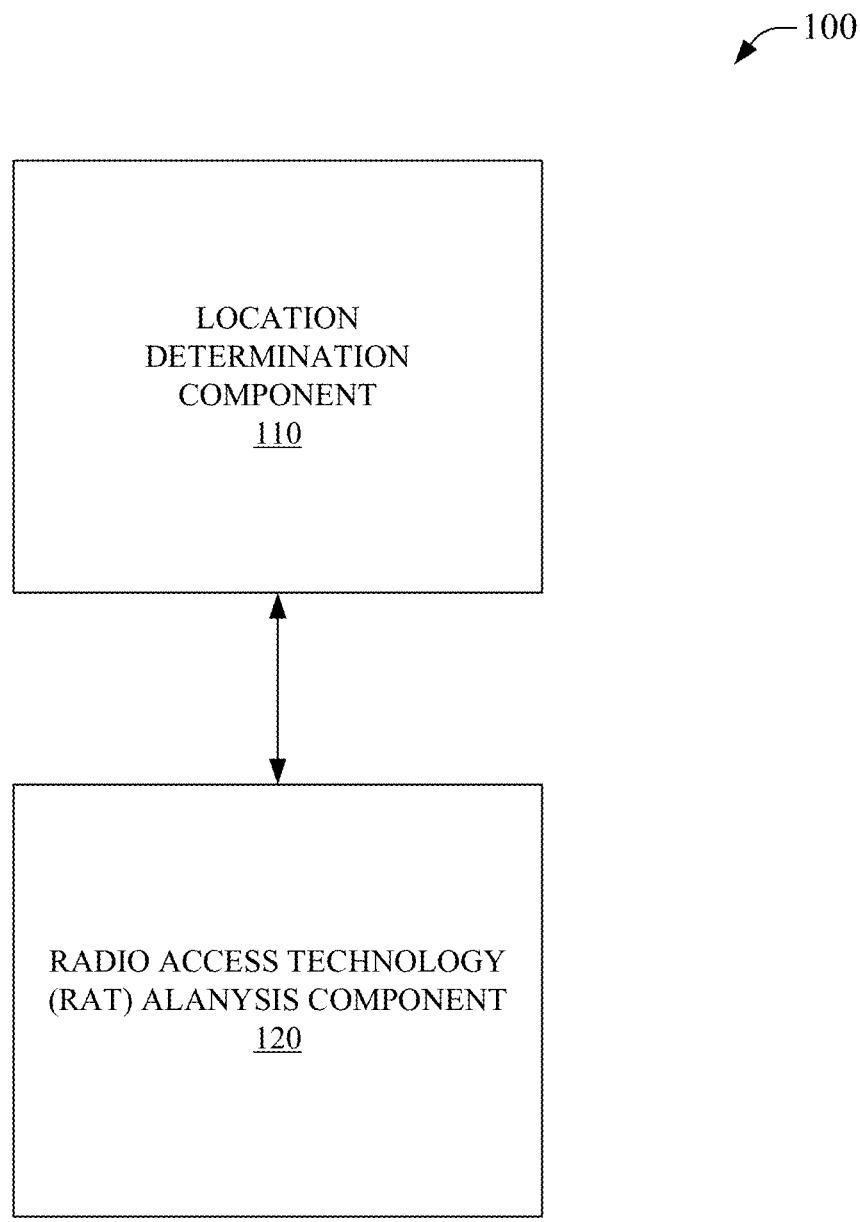
FIG. 1 is an illustration of a system that facilitates selection of a radio access technology resource based on historic information related to the radio access technology resource in accordance with aspects of the subject disclosure.

In contrast to conventional radio access technology (RAT) resource selection techniques or systems, the presently disclosed subject illustrates selection of a radio access technology resource based on historic information related to the radio access technology resource. Thus, wherein conventional RAT selection is typically ignorant of non-contemporaneous parameters, the disclosed subject matter can incorporate the history of a RAT resource in determining if that RAT resource is to be selected. For example, where two RAT resources are available for RAT selection, historical information for both RAT resources can be employed in the selection process according to the presently disclosed subject matter. As such, continuing this example, where historical information indicates that prior selection of the first of the two RAT resources frequently is followed by a loss of connection with the UE, and no such history is indicated for the second of the two RAT resources, the historical information can influence the RAT resource selection process such that the second RAT resource can be selected. Of note, the instant disclosure includes multiple RAT (mRAT) resource selection as a subset of RAT resource selection, such that selection of more than one RAT resource during RAT selection is within the scope of the present disclosure for selection of a RAT resource.

A radio access technology resource can be a radio connection technology between a UE and a Radio Network Controller (RNC) or other Access Point (AP), such as a femto-cell, 802.11 radio, etc. For example, RATs can include, but are not limited to, broadcast technologies (e.g., sub-Hz, ELF, VLF, LF, MF, HF, VHF, UHF, SHF, THz broadcasts, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced, etc. Of note, the instant disclosure expressly includes RAT resources paralleled in other current and/or future radio standards, particularly where related to communications with mobile devices.

Often, RAT characteristics (e.g., data rates, Quality of Service (QoS), etc.) can set by a wireless network provider or resource administrator, e.g., based on subscription parameters or requirements of media employing the RAT. The RAT configuration can influence RAT resource usage. For example, a RAT resource requiring credentials to access the resource, e.g., a password protected Wi-Fi access point or a MAC address filtered femto-cell, can be unusable by non-credentialed UEs and, as such, should be ignored by non-credentialed UEs. As a second example, a NodeB can provide a RAT resource, which can have bandwidth limits for streaming media, these limits set by a carrier owner. These bandwidth limits can be considered in determining the selection of the RAT resource by a UE in accordance with the present disclosure.

In an aspect, location information for a UE can be employed to facilitate access to historic information related to RAT resources. Historical information can expressly include correlation of a RAT resource to a location. Historical information can further include historical performance information for a RAT resource or other historical information associated with the RAT resource. For example, historic information for a period of time can be accessed for a location to indicate the potential presence of a RAT resource based on the historical presence of the RAT resource in the location. The historical information can be historical information from one or more UEs, e.g., a single UE history or the agglomerated history of multiple UEs. Further, historical information can be based on non-UE sources, such as a wireless carrier explicitly designating a location for a RAT resource in a RAT historical information database, etc. Location information can be based on nearly any form of location technology, including, global positioning system (GPS), enhanced GPS (eGPS), triangulation, multilateration, proximity sensing, timed fingerprint location (TFL, as disclosed more fully in the application incorporated herein by reference), inertial sensing, dead reckoning, etc.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Various embodiments relate to selecting a radio access technology resource. In one example embodiment, a system comprises a location determination component to determine a location, the location facilitating receiving historical information related to a radio access technology resource associated with the location. The exemplary system further comprises a radio access technology analysis component to designate a value to a radio access technology resource. This value can be designated based on the radio access technology resource satisfying a predetermined condition relating to the historical information. The designated value can be employed to rank or order radio access technology resources.

In another example embodiment, a method comprises receiving location information for a user equipment. The example method further comprises selecting a radio access technology resource from a radio access technology resource covering the location. The selection can be based on historical information associated with the radio access technology resource.

In another example embodiment, a computing device comprises a process configured to receive location information for a user equipment. The processor can further process the location information to determine historical information related to a radio access technology resource. Moreover, the processor can be configured to designate a value to the radio access technology resource based on the historical information satisfying a predetermined condition. The designated value can be employed to select a radio access technology resource.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings.

FIG. 1 is an illustration of a system 100, which facilitates selection of a radio access technology resource based on historic information related to the radio access technology resource in accordance with aspects of the subject disclosure. System 100 can include location determination component 110. Location determination component 110 can facilitate access to location information. Location information can be based on nearly any form of location technology, including, GPS, enhanced GPS (eGPS), triangulation, multilateration, proximity sensing, TFL, inertial sensing, etc. For example, a location can be determined from a GPS component of a UE. As a second example, a TFL component of a UE can provide a location.

System 100 can further include radio access technology (RAT) analysis component 120. RAT analysis component 120 can be communicatively coupled to location determination component 110. RAT analysis component 120 can facilitate the analysis of one or more RAT resources. In an aspect, a RAT resource can be analyzed based on location information, e.g., location information from location determination component 110. For example, a location can be determined by location determination component 110. This location can be correlated with a RAT resource. RAT analysis component 120 can analyze the RAT resource correlated with the location determined by location determination component 110. Continuing the present example, the analysis can include the determination of the contemporaneous characteristics (e.g., bandwidth, QoS, etc.) of the correlated RAT resource and historical information related to the RAT resource. Historical information related to the RAT resource can be nearly any type of data and can include, historical characteristic information, historical performance information, historical repair information, historical performance of devices bound to the RAT resource, e.g., performance of a channel on the RAT resource, etc., or nearly any other type of information cataloged and correlated with the RAT resource.

RAT analysis component 120 can determine what RAT resources can be available for a location given the historical availability of RAT resources in the location. This can allow a UE to predetermine which radios can be turned on to scan for a RAT resource in an area and can result in longer battery life between charges. Where a UE can have a radio turned off, power does not need to be expended on that radio while the radio is off. As such, where RAT analysis component 120 indicates that a RAT resource has historically been available in the location, and the RAT is satisfies predetermined selection conditions, the UE can turn on the appropriate radio to scan for the RAT resource and attempt to connect to the selection. This allows the UE to turn the radio on after the RAT analysis component 120 predetermines a likelihood of the RAT resource being suitable and/or available in the location. Where a UE can include a plurality of radios, the battery saving effect of 'anticipating the availability of a RAT resource', e.g., keeping a radio off until a likely resource is available, can be even more beneficial.

RAT analysis component 120 can analyze a RAT resource to facilitate determining the suitability of selecting a RAT resource. RAT selection events, including selecting mRATs, can include determining the suitability of a radio access technology to bear data. Typically, selection of a RAT can include determining satisfactory levels of availability, accessibility, bandwidth, quality, etc. As such, consideration of these contemporaneous characteristics of a RAT resource can be included in analysis of a RAT resource. However, historical information can also be employed in the analysis. As such, even where a RAT resource can satisfy contemporaneous characteristics for selection of a RAT, where the past performance of the RAT resource indicates other parameters, the RAT resource can be determined to be more or less suitable than other RAT resources. For example, where a first RAT resource historically has higher throughput than a second RAT resource, the first RAT resource can be selected as the more suitable. However, where historic performance of the first RAT resource indicates that data connections are frequently lost, this factor can be considered in an analysis by RAT analysis component 120, such that the second RAT resource is ranked as more suitable that the first RAT resource despite having historically lower throughput.

As a non-limiting example, assume that bandwidth from a WiFi access point connection are much higher than for an 800 MHz cellular connection. A subscriber with a data connection on a UE can allow the UE to select a RAT for continued data transmission. Further, assume the WiFi connection is historically associated with frequent radio interference. Analysis of the WiFi with higher bandwidth and historic interference against the lower bandwidth cellular connection can be conducted. Selection of the WiFi RAT can be effected where, for example, the data transmission is tolerant of connectivity faults, e.g., resending lost packets for intermittent interruption of the RF link can be more easily tolerated for downloading web pages than for streaming video or voice over internet protocol (VoIP). In contrast, the lower bandwidth cellular connection can be selected where more reliable communications at a slower rate are more tolerable than faster but intermittent service. As such, selection of a RAT resource RAT analysis component 120 can benefit from access to historical information related to the RAT resources as compared to simply selecting a RAT based on contemporaneous information.

In an embodiment, RAT analysis component 120 can also take into account the classifications of data for transmission. Data classification can include, for example, voice classification, data classification, VoIP data classification, streaming data classification, etc., which classifications can be considered in determinations of risk related to data loss. For example, loss of voice data can be ranked as less acceptable than loss of streaming data class or data in a buffered data stream class, etc. Analysis of RAT resources, by RAT analysis component 120, to weigh the risks of, for example, a voice or data session failing during handover against, for example, not selecting a RAT resource to prevent the handover associated with corresponding buffering or loss of data can be performed. Where RAT resources can be associated with some potential for data loss, the historical information for a RAT resource can provide for quantification of said data loss potential. As such, historical information related to RAT resources can be employed in balancing acceptable data loss parameters against selection of a RAT resource for a potential handover event.

In some embodiments, RAT analysis component 120 can employ one or more rules in analyzing a RAT resource. A rule can be an algorithm or other logic employed in analysis of a RAT resource, such as selecting a RAT resource from a set of RAT resources. As a non-limiting example, a rule can be employed to rank or order a set of RAT resources such that a subset of the RAT resources includes RAT resources ranked or ordered by, for instance, reliability, risk of data loss, bandwidth, success of access, sustainability of access, QoS, etc. Thus, a RAT resource can be analyzed and ranked based on both a contemporaneous characteristic and/or historical information associated with the RAT resource. Ranked subsets of RAT resources can facilitate selection of a RAT resource, e.g., selection of the highest ranked RAT resource. For example, a RAT resource with a history of sustained accessibility, e.g., a connection that remains stable for at least a predetermined period of time, can be selected where it is ranked higher than a RAT resource indicating a history of less sustained access. It is noteworthy that a nearly limitless number of other exemplary permutations can be presented to illustrate the benefits of analysis of historical information associated with RAT resources in the selection of a RAT resource, but further enumeration of examples are truncated simply for brevity and clarity, though all other permutations are to be considered within the scope of the present disclosure.

Figure 2:
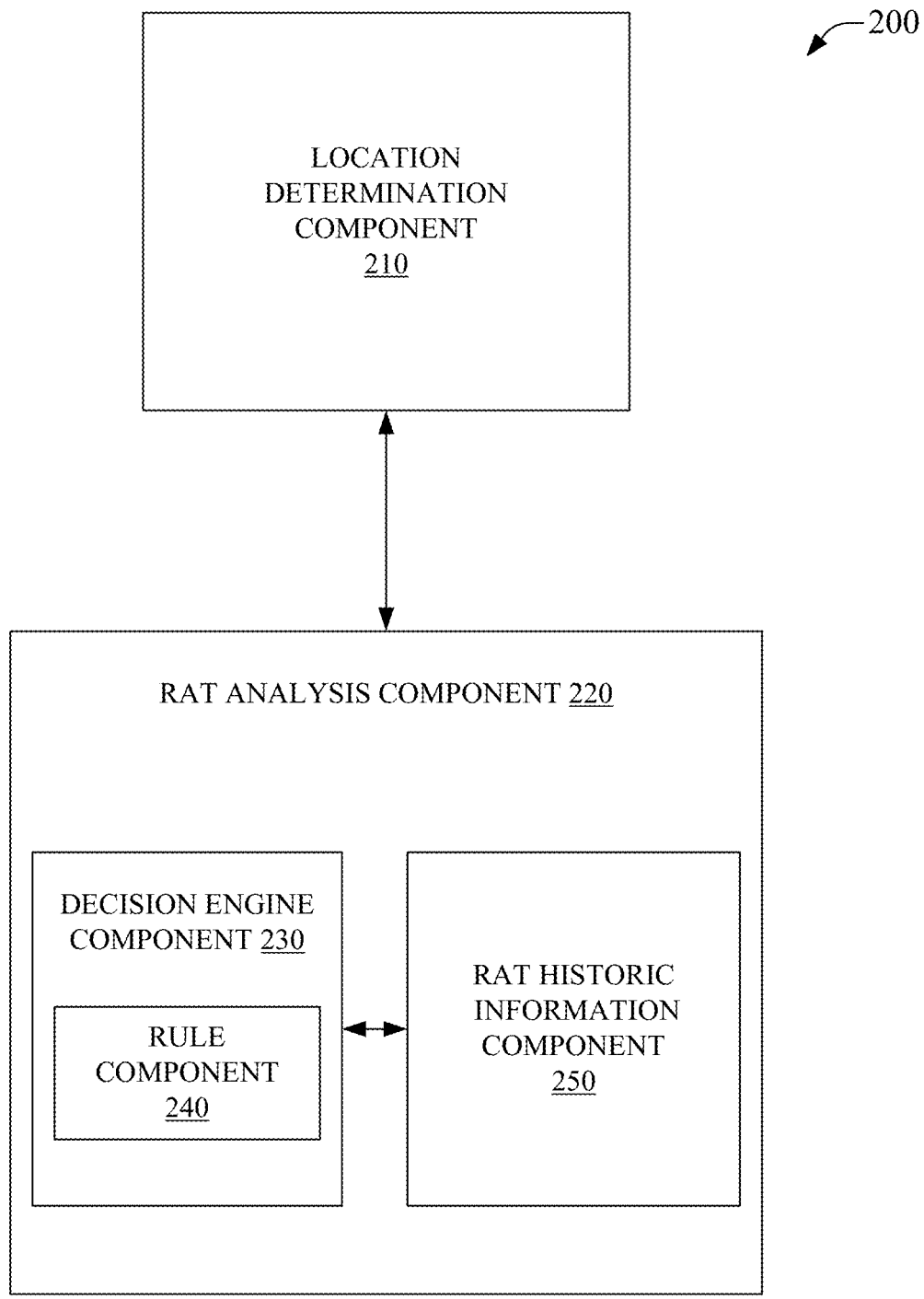
FIG. 2 is a depiction of a system that facilitates selection of a radio access technology resource based on historic information related to the radio access technology resource in accordance with aspects of the subject disclosure.

FIG. 2 is a depiction of a system 200 that can facilitate selection of a radio access technology resource based on historic information related to the radio access technology resource in accordance with aspects of the subject disclosure. System 200 can include location determination component 210. Location determination component 210 can facilitate access to location information. Location information can be based on nearly any form of location technology, including, GPS, enhanced GPS (eGPS), triangulation, multilateration, proximity sensing, TFL, inertial sensing, etc.

System 200 can further include RAT analysis component 220. RAT analysis component 220 can be communicatively coupled to location determination component 210. RAT analysis component 220 can facilitate the analysis of one or more RAT resources. In an aspect, a RAT resource can be analyzed based on location information, e.g., location information from location determination component 210. Further, RAT analysis component 220 can analyze contemporaneous information related to a RAT, historical information related to a RAT resource, or combinations thereof. RAT analysis component 220 can include decision engine component 230.

Decision engine component 230 of system 200 can facilitate forming determinations relating to RAT resources. Determinations can include anticipating the availability of a RAT resource, selection of a RAT resource, ranking RAT resources, designating that a suitable RAT resource is not available, or combinations thereof. For example, where location information is employed to receive information relating to a plurality of RAT resources for a given region, said RAT resources can be ranked in order of highest to lowest suitability for a RAT resource for a particular data class, ranked in order of longest to shortest historically sustained access, e.g., ranking which RAT, in the past, resulted in the most sustained data connections and which resulted in poorest data connections that dropped quickly, designation of a specific RAT resource from the plurality that is the most suitable for a data stream, designation that no RAT resource from the plurality is appropriate, etc.

In an aspect, decision engine component 230 can include rule component 240 to facilitate forming determinations related to a RAT resource. Rule component 240 can facilitate employing one or more rules, such as rules for selecting a RAT resource, ranking a RAT resource, rules for including a RAT resource in a subset of RAT resources, etc. In an embodiment, rule component 240 can be a rule engine that allows the application of logical determinations to be embodied in one or more algorithms related to the analysis of a RAT resource. As a non-limiting example, rule component 240 can generate a rule that alters a ranking of a RAT resource based on a historical information related to the RAT resource, such as increasing a ranking score where the RAT resource historically is associated with highly sustained access or decreasing a ranking score where the RAT resource historically is associated with interrupted data connections. As a second non-limiting example, rule component 240 can generate a rule that alters a ranking of a RAT resource based on a historical information related to the RAT resource, such as conditionally decrementing a ranking during a peak usage period based on historic overload of said RAT resource during peak usage hours, e.g., where the RAT resource historically is overloaded and the use of said RAT resource can be associated with lower levels of bearer functionality during the peak period.

In other embodiments, rule component 240 can directly apply predetermined rules to selection of a RAT resource. For example, rule component 240 can apply a location-forecasting rule that projects the future location of a UE based on the present or historic location information associated with the UE. The exemplary location-forecasting rule can, for instance, indicate that a UE will be at a certain location at a certain time based on the current location and rate of speed of the UE based on the present location of the UE and the recent historical locations of the UE. More specifically, in this non-limiting example, where a UE is determined to be traveling at 60 miles per hour (MPH) along a freeway and is further determined to be 1 mile from the next exit ramp along that freeway, a forecast can be determined that the UE will be at or near the next exit in 60 seconds. In contrast, where the UE is determined to be at the same location but only traveling at 40 MPH, the forecast time to the next exit ramp could be computed as between 90 seconds. Where a RAT resource is associated with the future location, e.g., anticipated to be available at or near the next exit, the forecast location of the UE can be valuable in proactively selecting a RAT resource and timing when the appropriate radio in the UE should be turned on to scan for the anticipated RAT resource. Continuing the example, where the UE is traveling at 60 MPH, it can be determined that turning on a UE radio after 90 seconds is excessive (the UE may have passed the RAT resource) while waiting 45 seconds is not (the UE would likely still be approaching the RAT resource). In contrast, where the UE is traveling at 40 MPH, turning on the radio at 45 seconds can waste valuable battery life and it can be determined to wait 75 seconds before turning on the radio to scan for the RAT resource. Further explicit examples are not provided for brevity but all such examples are to be considered within the scope of the present disclosure.

System 200 can further include RAT historic information component 250. RAT historic information component 250 can facilitate receiving historical information related to a RAT resource. RAT historic information component 250 can include local, remote, or distributed data stores including RAT resource data and other historical information related to a RAT resource. For example, RAT historic information component 250 can facilitate access to historic RAT resource characteristic information, e.g., bandwidth, QoS, power levels for uplink and downlink, min/max/average data channel link times, etc. As a second example, RAT historic information component 250 can facilitate access to data relating to a RAT resource, such as, locations correlated with access to the RAT resource, prior ranking of the RAT resource, proximity of a RAT resource to other RAT resources, maintenance records for systems supporting the RAT resource, etc. RAT historic information component 250 can be communicatively coupled to decision engine component 230 of RAT analysis component 220 to facilitate the selection of a RAT resource based on historical information related to the RAT resource.

Figure 3:
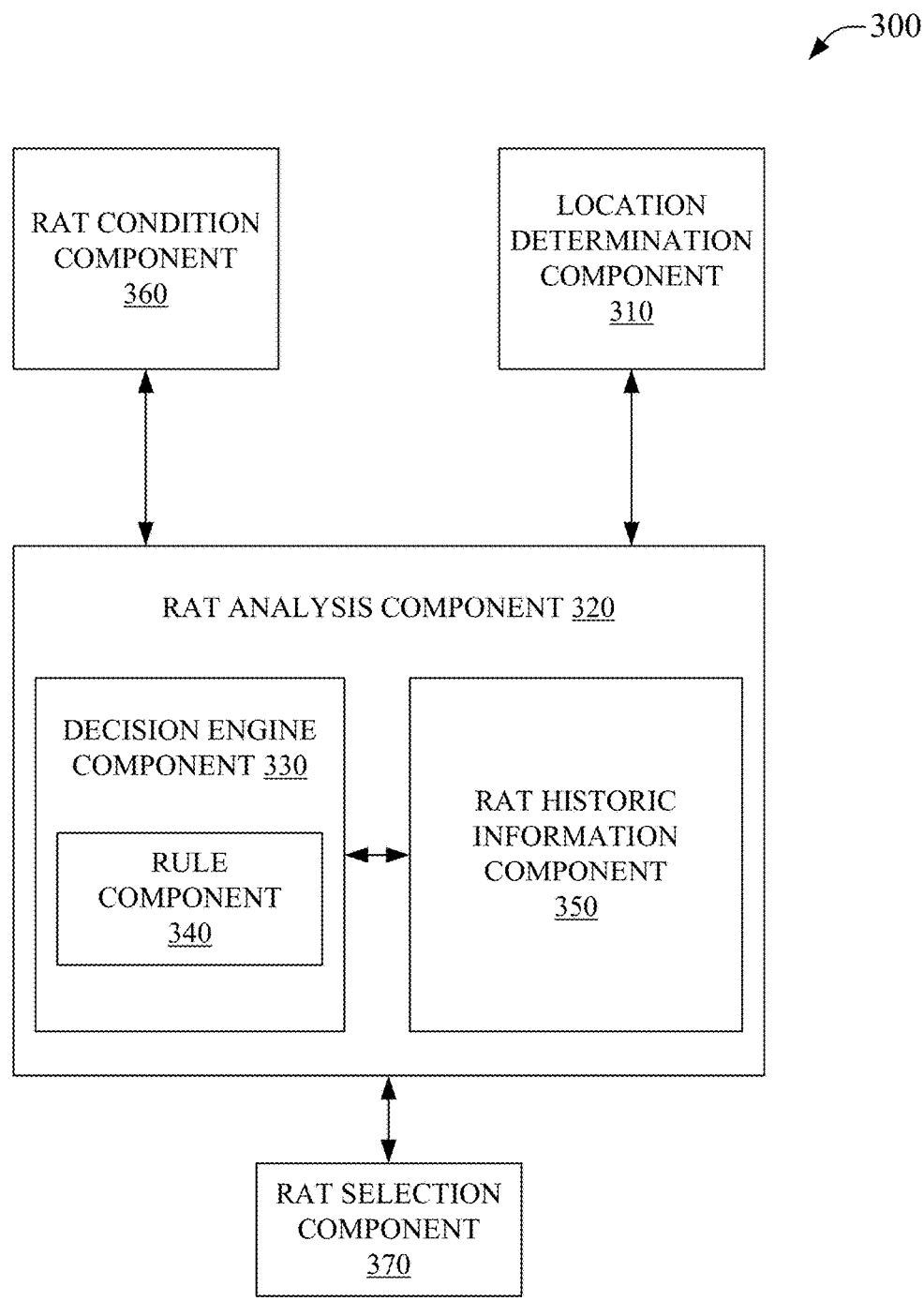
FIG. 3 illustrates a system that facilitates selection of a radio access technology resource based on historic information related to the radio access technology resource in accordance with aspects of the subject disclosure.

FIG. 3 illustrates a system 300 that facilitates selection of a radio access technology resource based on historic information related to the radio access technology resource in accordance with aspects of the subject disclosure. System 300 can include location determination component 310. Location determination component 310 can facilitate access to location information. Location determination component 310 can be communicatively coupled to RAT analysis component 320. RAT analysis component 320 can facilitate the analysis of one or more RAT resources. In an aspect, a RAT resource can be analyzed based on location information, e.g., location information from location determination component 310. Further, RAT analysis component 320 can analyze contemporaneous information related to a RAT, historical information related to a RAT resource, or combinations thereof.

RAT analysis component 320 can include decision engine component 330 that can facilitate forming determinations relating to RAT resources. Decision engine component 330 can include rule component 340 to facilitate forming determinations related to a RAT resource. Further, decision engine 330 can be communicatively coupled to RAT historic information component 350. RAT historic information component 350 can facilitate receiving historical information related to a RAT resource. RAT historic information component 350 can include local, remote, or distributed data stores including RAT resource data and other historical information related to a RAT resource.

System 300 can further include RAT condition component 360. RAT condition component 360 can facilitate access to contemporaneous information related to a RAT resource. Contemporaneous information related to a RAT resource can include contemporaneous information related to a currently employed RAT resource, e.g., where a RAT resource is being employed by a UE to transmit data, contemporaneous information related to that RAT resource can be received by way of RAT condition component 360. Contemporaneous information related to a RAT resource can also include contemporaneous information related to a RAT resource that can be potentially employed by a UE, e.g., where a RAT resource is available for use by a UE, contemporaneous information related to that RAT resource can be received by way of RAT condition component 360. In an aspect, RAT condition component 360 can function to gather contemporaneous data, e.g., at a UE, rather than looking up contemporaneous data. For example, contemporaneous data on a RAT resourced can be accessed through RAT historic information component 350 from other UEs in the area while RAT contemporaneous data can be measured and reported from the instant UE by RAT condition component 360. RAT condition component 360 can function in conjunction with location determination component 310. In a further embodiment, location component 310 can determine a UE location, which location information can be received by RAT condition component 360. Based on the location information, RAT condition component 360 can receive the present characteristics of RAT resources in, or near, the determined location. For example, a determination that a UE is located at an office tower, can be received by RAT condition component 360, which, in turn, can access current RAT characteristics for RAT resources at, or near, the office tower. This can facilitate inclusion of contemporaneous aspects of a RAT resource in selection of a RAT resource based on historical information related to the RAT resource as facilitated by RAT analysis component 320.

System 300 can also include RAT selection component 370. RAT selection component 370 can select a RAT based on the analysis of a RAT resource from RAT analysis component 320. As such, in system 300, location information can facilitate determining a RAT resource and both current and past information relating to the RAT resource can be accessed and included in an analysis of the RAT resource. The analysis can, as disclosed herein, relate to indication of a particular RAT resource, to ranking or ordering of RAT resources, or to indication of no acceptable RAT resource. RAT selection component 370 can select a RAT resource based on the analysis, e.g., selecting a particular RAT resource, selection of a ranked RAT resource, or selection of no RAT resource.

Figure 4:
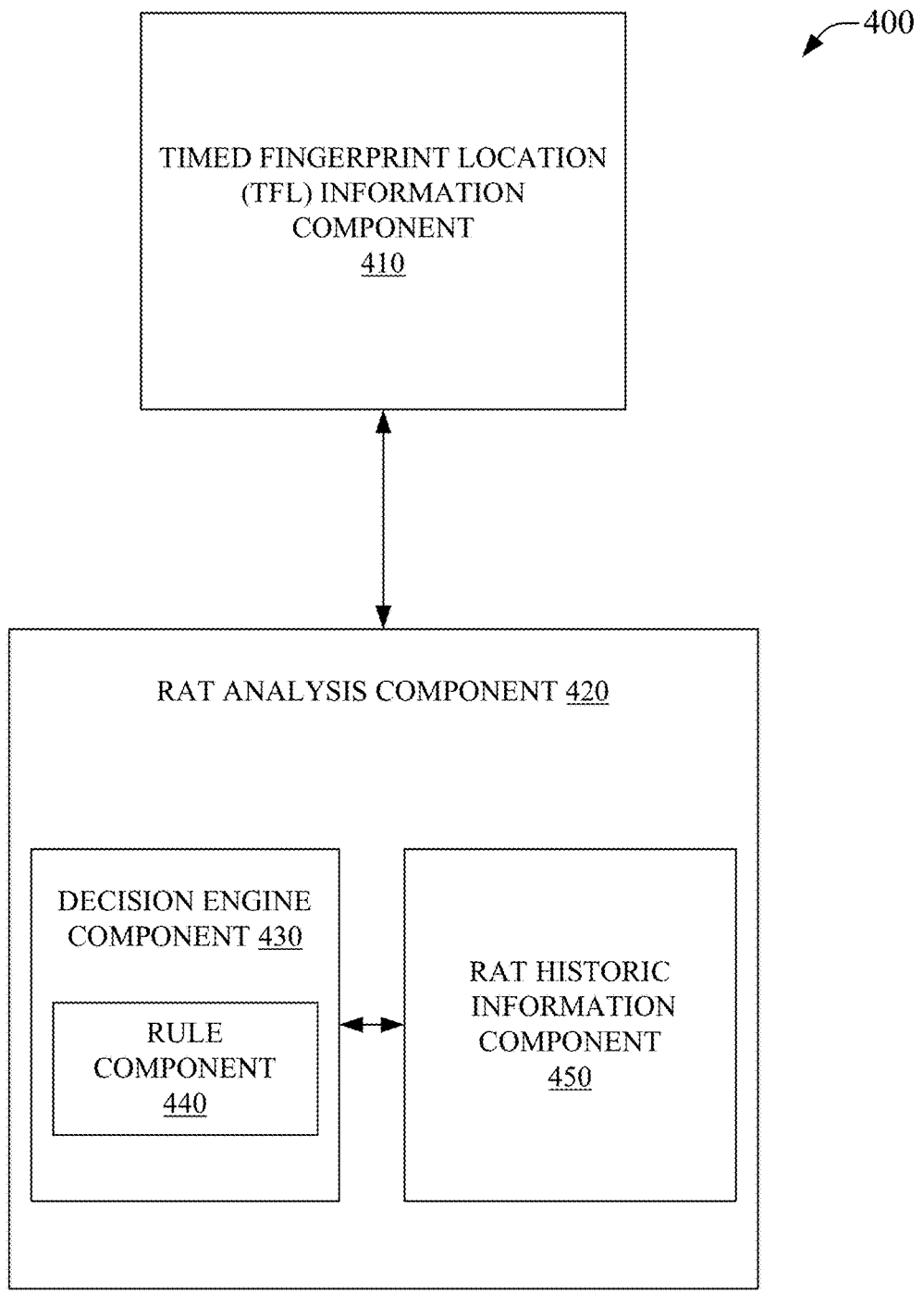
FIG. 4 is a depiction of a system that facilitates selection of a radio access technology resource based on historic information related to the radio access technology resource by employing timed fingerprint location information in accordance with aspects of the subject disclosure.

FIG. 4 is a depiction of a system 400 that facilitates selection of a radio access bearer resource based on historic information related to the radio access bearer resource by employing timed fingerprint location information in accordance with aspects of the subject disclosure. System 400 can include TFL location information component 410. TFL location information component 410 can facilitate receiving TFL information. TFL location information component 410 can be communicatively coupled to RAT analysis component 420. RAT analysis component 420 can facilitate the analysis of one or more RAT resources. In an aspect, a RAT resource can be analyzed based on location information, e.g., location information from TFL location information component 410. Further, RAT analysis component 420 can analyze contemporaneous information related to a RAT, historical information related to a RAT resource, or combinations thereof.

RAT analysis component 420 can include decision engine component 430 that can facilitate forming determinations relating to RAT resources. Decision engine component 430 can include rule component 440 to facilitate forming determinations related to a RAT resource. Further, decision engine 430 can be communicatively coupled to RAT historic information component 450. RAT historic information component 450 can facilitate receiving historical information related to a RAT resource. RAT historic information component 450 can include local, remote, or distributed data stores including RAT resource data and other historical information related to a RAT resource.

In an aspect TFL location information component 410 can facilitate access to TFL information. TFL information can be a source of location information for UEs. Moreover, TFL information can be employed at various levels of granularity. Further, TFL information can be employed with little to no additional power consumption. TFL information can provide advantages over GPS-type techniques, near field communication techniques, or proximity sensor techniques and is distinct from these other forms of location determination.

TFL information can include location or timing information as disclosed in more detail in U.S. Ser. No. 12/712,424 filed Feb. 25, 2010, which application is hereby incorporated by reference in its entirety. As such, TFL component 110 can facilitate access to location information for a UE and TFL information can be information from systems in a timed fingerprint location wireless environment, such as a TFL component of a wireless telecommunications carrier. As a non-limiting example, a mobile device, including mobile devices not equipped with a GPS-type system, can be located by looking up timing information associated with the mobile device from a TFL information reference.

In an aspect, TFL information can include information to determine a differential value for a NodeB site pair and a bin grid frame, as disclosed in more detail in incorporated U.S. Ser. No. 12/712,424. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to narrow the possible locations of the UE further by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

As such, TFL location information component 410 can be employed to determine a UE location and such location can be further employed in determining RAT resources. Where the location of a UE is determined, the RAT resources for that area can be accessed based on historical information including the presence of a RAT resource in a location. As such, contemporaneous and historical information relating to the RAT resource near a location can be accessed and analyzed to determine if the RAT resource meets predetermined criteria for selection of the RAT resource.

Figure 5:
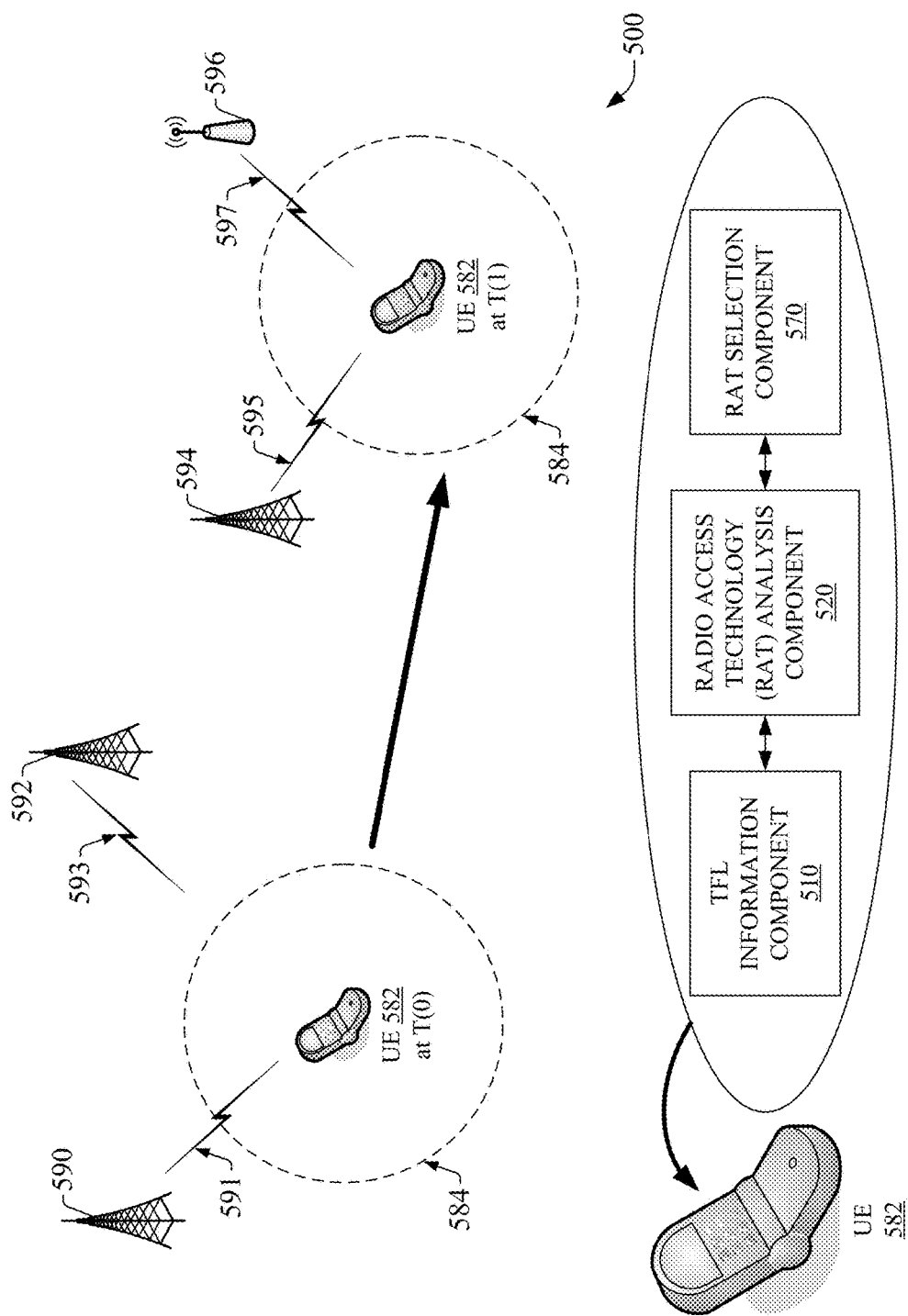
FIG. 5 illustrates a non-limiting exemplary system facilitating selection of a radio access technology resource based on historic information related to the radio access technology resource by employing timed fingerprint location information in accordance with aspects of the subject disclosure.

FIG. 5 illustrates a non-limiting exemplary system 500 facilitating selection of a radio access technology resource based on historic information related to the radio access technology resource by employing timed fingerprint location information in accordance with aspects of the subject disclosure. System 500 can include UE 582 that can include TFL information component 510, RAT analysis component 520, and RAT selection component 570. TFL information component 510 can facilitate determining the location of UE 582 based on TFL information as disclosed herein. RAT analysis component 520 can facilitate analysis of a RAT resources based on historical information related to the RAT resource as disclosed herein. RAT selection component 570 can facilitate selection of a RAT resource based on the analysis of the RAT resource by RAT analysis component 520, as disclosed herein. UE 582 can be traveling from T(0) to T(1) as illustrated.

System 500 can further include NodeBs 590, 592, and 594, and access point 596. Each of these NodeBs and/or access point can facilitate a communications link (e.g., RAT resource 591, 593, 595, and 597 respectively) with UE 582 as illustrated. As such, at T(0), UE 582 can be far enough from NodeB 590 that links on RAT 591 are weakening and access to another RAT resource is increasingly desirable to maintain continuity of data transmission. Of note, NodeB 592 and related RAT resource 593 can be located too far from the area 584 around UE 582 at T(0) to effect a communicative coupling, as illustrated.

At T(1), TFL location information can be accessed at 510 to determine the location of UE 582 at T(1). The location of UE 582 at T(1) can be employed to anticipate the availability of RAT resource 595 and 597. As such, an analysis of the historical information related to each of RAT resource 595 and 597 can be conducted to determine compliance with a predetermined condition. This historical information can be combined with contemporaneous information to generate a result of the analysis, e.g., a ranking of the RAT resources 595 and 597 by RAT analysis component 520. At 570, RAT selection component 570 can cause a selection of a RAT resource.

As an example, RAT resource 597 can be historically a very reliable and high bandwidth RAT resource. However, use of RAT 596 can require that two radios be turned on in UE 582 at T(1), e.g., a cellular radio for access to RAT 595 on NodeB 594 and a WiFi radio for access to RAT resource 597 on access point 596. As such, the additional battery drain to run two radios can be considered as more significant than the increase in bandwidth available to UE 582 at T(1). Therefore, RAT selection component 570 can select RAT resource 595 for the lower power consumption and satisfactory bandwidth. However, where a high bandwidth need arises on UE 582 at T(1), RAT selection component 570 can select RAT 587 from access point 596 despite the increased battery consumption to accommodate the higher bandwidth needs.

FIG. 5 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are in system 500, the timing information from those legacy devices can be employed in TFL location information determinations and similarly in selection of RAT resources based on historical information related to the RAT resources. This can be particularly useful in regions that have limited distribution of GPS enabled UEs or where GPS functions poorly due to environmental factors such as urban cores, mountainous regions, etc.

Figure 6:
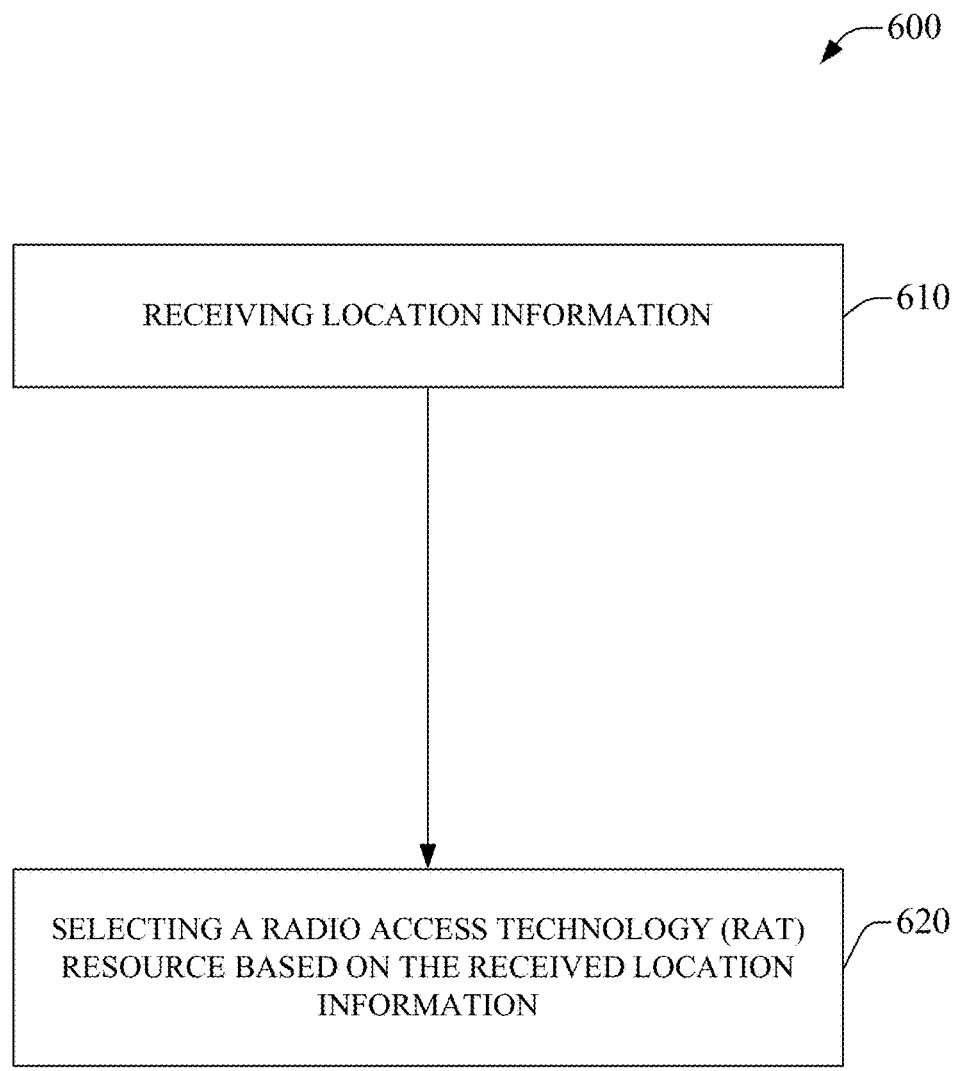
FIG. 6 illustrates a method facilitating selection of a radio access technology resource based on historic information related to the radio access technology resource in accordance with aspects of the subject disclosure.
Figure 7:
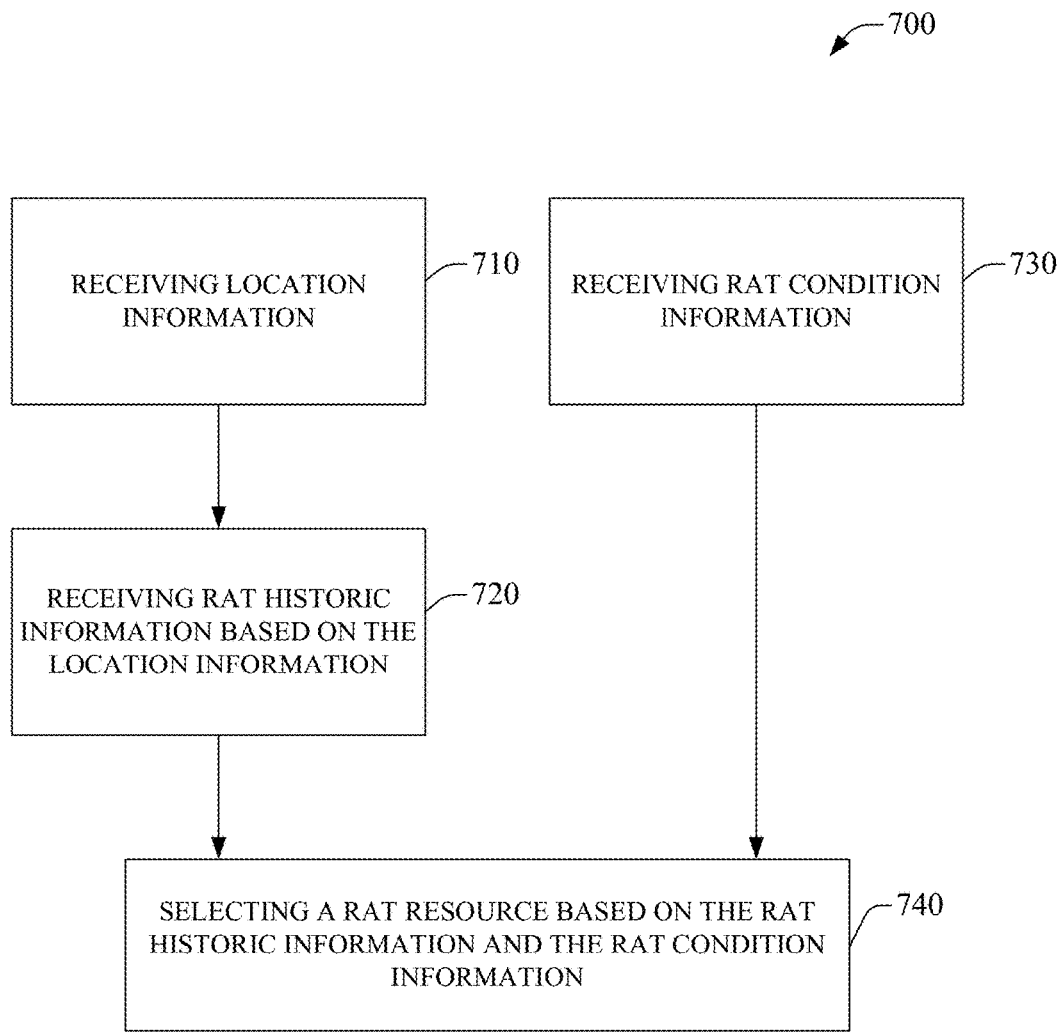
FIG. 7 illustrates a method for facilitating selection of a radio access technology resource based on historic information related to the radio access technology resource in accordance with aspects of the subject disclosure.
Figure 8:
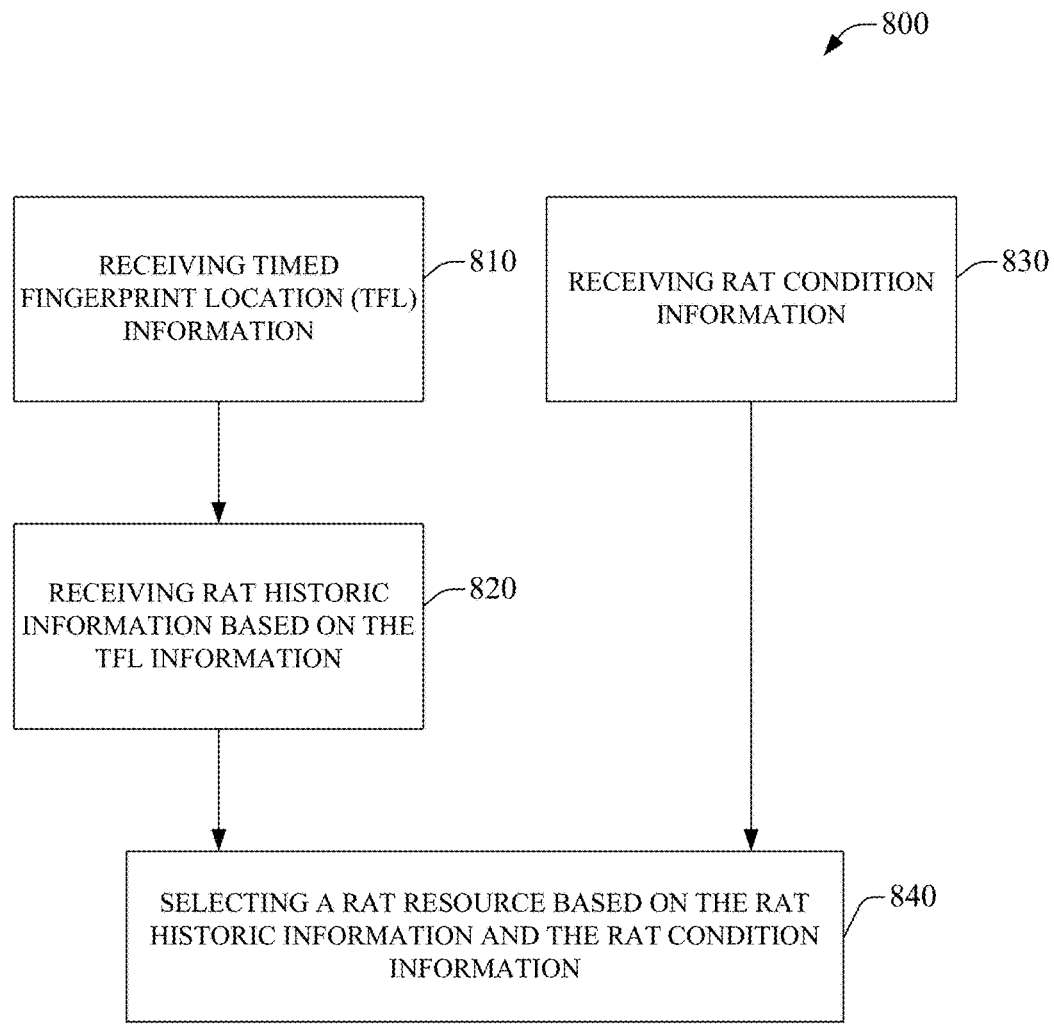
FIG. 8 illustrates a method for facilitating selection of a radio access technology resource based on historic information related to the radio access technology resource by employing timed fingerprint location information in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating selection of a radio access technology resource based on historic information related to the radio access technology resource in accordance with aspects of the subject disclosure. At 610, method 600 can receive location information. Location information can be received from nearly any form of location technology, including, GPS, enhanced GPS (eGPS), triangulation, multilateration, proximity sensing, TFL, inertial sensing, etc. For example, location information can be received from a GPS component of a UE. As a second example, location information can be received from a TFL component.

In an aspect, location information for a UE can be employed to facilitate access to historic information related to RAT resources. For example, historic information for a period can be accessed for a region when a UE is determined to be in or near said region. As such, RAT histories for RAT resources in a region around a mobile device can be received. For example, a location can be used to anticipate the availability of a RAT resource in, or near, the location. Further, RAT histories for RAT resources in a region in which a mobile device is present can be received. Moreover, RAT histories for RAT resources in a region in which a mobile device is expected to enter can be received.

At 620, method 600 can select a RAT resource based on the location information received in 610. At this point, method 600 can end. Selection of a RAT resource can be based directly on the location of a UE. Further, selection of a RAT resource at 620 can include consideration of historical information relating the RAT resource based on the location information received. For example, location information received at 610 can be employed to determine that historically, a set of RAT resources have been previously detected at the location and thus can be considered as an initial set or RAT resources available for consideration.

Further, the set of RAT resources can be associated with historical characteristics, parameters, and performance metrics that can also be accessed and employed in selecting a RAT resource. For example, a RAT resource with a history of well-sustained access can be more highly ranked, e.g., more likely selected, than a RAT resource that has a history of rapidly dropped links. Of note, the historical set can include RAT resources that are no longer available, but these RAT resources can be quickly removed from the set, e.g., by scanning for the RAT resource where said resource meets conditions for selection of that resource for a handover event. Moreover, additional RAT resources can be available at a location than are included in the historical set for a variety of reasons, e.g., a RAT resource can be newer than the most recent historical event in the set, etc. These additional RAT resources can also be considered in selecting a RAT resource at 620, although they can lack historical information that can be considered for RAT resources associated with the historical set of RAT resources. As such, the selection of a RAT resource from the additional RAT resources can be based on a more minimal information set, e.g., that may not consider historical information associated with a RAT resource.

In an embodiment, location information can be associated with predetermined rankings of RAT resources based on the historical information associated with the RAT resources in an area at, or near, the location. By preprocessing and ranking the RAT resources, a UE can rapidly select a RAT resource, for example, by employing a lookup table based on location. Further, access to RAT resource rankings by location can supplement contemporaneous measurements of RAT resources at the UE for selection of a RAT resource. This has the advantage that minimal additional processing is needed to significantly augment the conventional RAT selection process with historical information associated with a RAT resource. Numerous other advantages are not explicitly disclosed for clarity and brevity but are considered within the scope of the present subject matter with regard to incorporation of historical information related to a RAT resource in selecting a RAT resource.

FIG. 7 illustrates a method 700 that facilitates selection of a radio access technology resource based on historic information related to the radio access technology resource in accordance with aspects of the subject disclosure. At 710, method 700 can receive location information. At 720, location information from 710 can be employed to facilitate access to historic information related to RAT resources.

At 730, RAT resource condition information can be received. RAT condition information can include contemporaneous information for RAT resources associated with the location information, e.g., from 710. Further, RAT condition information can include contemporaneous information for RAT resources not associated with a particular location, e.g., a RAT resource can be newer than a set of RAT resources returned for a lookup for a particular location, etc. This contemporaneous information for RAT resources can be include RAT characteristics, such as, bandwidth, QoS, uplink and downlink power, frequency, etc., and can reflect the current conditions for potential RAT links on those RAT resources.

At 740, method 700 can select a RAT resource based on the historical information related to a RAT resource form 720 and contemporaneous RAT resource conditions from 730. At this point, method 700 can end. Selection of a RAT resource can include consideration of historical information relating the RAT resource received at 720. For example, historically a set of RAT resources can be associated with a particular location. As a second example, historically a RAT resource can be associated with particularly desirable or undesirable performance characteristics, which can serve as a predictor of future RAT resource performance. These historical characteristics, parameters, and performance metrics can be accessed and employed in selecting a RAT resource at 740. Access and employment of historical data from 720 can be considered in light of contemporaneous RAT condition information received at 730. For example, a RAT resource with a history of well-sustained handover events can be selected over a RAT resource that has a higher contemporaneous bandwidth. As a second example, a RAT resource with a high contemporaneous QoS can be selected from two RAT resources both having histories of well-sustained access.

As previously noted, a historical set can include RAT resources that are no longer available, but these RAT resources can be quickly removed from the set, e.g., by way of a simple radio scan for the resources at the location. Also as previously noted, additional RAT resources can be available at a location. These additional RAT resources can also be considered in selecting a RAT resource at 740, although they can lack historical information. Further, in some embodiments, location information can be associated with predetermined rankings of RAT resources based on the historical information associated with the RAT resources in a region at, or near, a location, which can significantly augment the conventional RAT selection process with historical information associated with a RAT resource.

FIG. 8 illustrates a method 800 that facilitates selection of a radio access bearer resource based on historic information related to the radio access bearer resource by employing timed fingerprint location information in accordance with aspects of the subject disclosure. At 810, method 800 can receive timed fingerprint location (TFL) information. TFL information can include location information as disclosed in more detail in U.S. Ser. No. 12/712,424 filed Feb. 25, 2010, which application, as previously stated, is hereby incorporated by reference in its entirety. As such, TFL information can include location information for a UE based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to narrow the possible locations of the UE further. Employing TFL information for location determination is demonstrably different from conventional location determination techniques or systems such as GPS, eGPS, triangulation or multilateration in wireless carrier environments, near field techniques, or proximity sensors.

At 820, TFL information from 810 can be employed to facilitate access to historic information related to RAT resources. For example, TFL information received at 810 can be employed to determine that historically, a set of RAT resources have been previously detected at the location and thus can be considered as an initial set of RAT resources. The set of RAT resources can also be associated with historical characteristics, parameters, and performance metrics that can also be accessed and employed in selecting a RAT resource. For example, a RAT resource with a history of poorly sustained access can be removed from a set of selectable RAT resources. Of note, the historical set can include RAT resources that are no longer available, but these RAT resources can be quickly removed from the set, as previously disclosed.

At 830, RAT resource condition information can be received. RAT condition information can include contemporaneous information for RAT resources associated with the TFL information, e.g., from 810. Further, RAT condition information can include contemporaneous information for RAT resources not associated with a particular location, e.g., a RAT resource can be newer than a set of RAT resources returned for a lookup for a particular location, etc. This contemporaneous information for RAT resources can be include RAT characteristics, such as, bandwidth, QoS, uplink and downlink power, frequency, etc., and can reflect the current conditions for potential RAT links on those RAT resources. At 840, method 800 can select a RAT resource based on the historical information related to a RAT resource form 820 and contemporaneous RAT resource conditions from 830. At this point, method 800 can end.

As previously noted, a historical set can include RAT resources that are no longer available, but these RAT resources can be quickly removed from the set. Also, as previously noted, additional RAT resources can be available at a location. These additional RAT resources can also be considered in selecting a RAT resource at 840, although they can lack historical information. Further, in some embodiments, location information can be associated with predetermined rankings of RAT resources based on the historical information associated with the RAT resources in a region at, or near, a location, which can significantly augment the conventional RAT selection process with historical information associated with a RAT resource.

Figure 9:
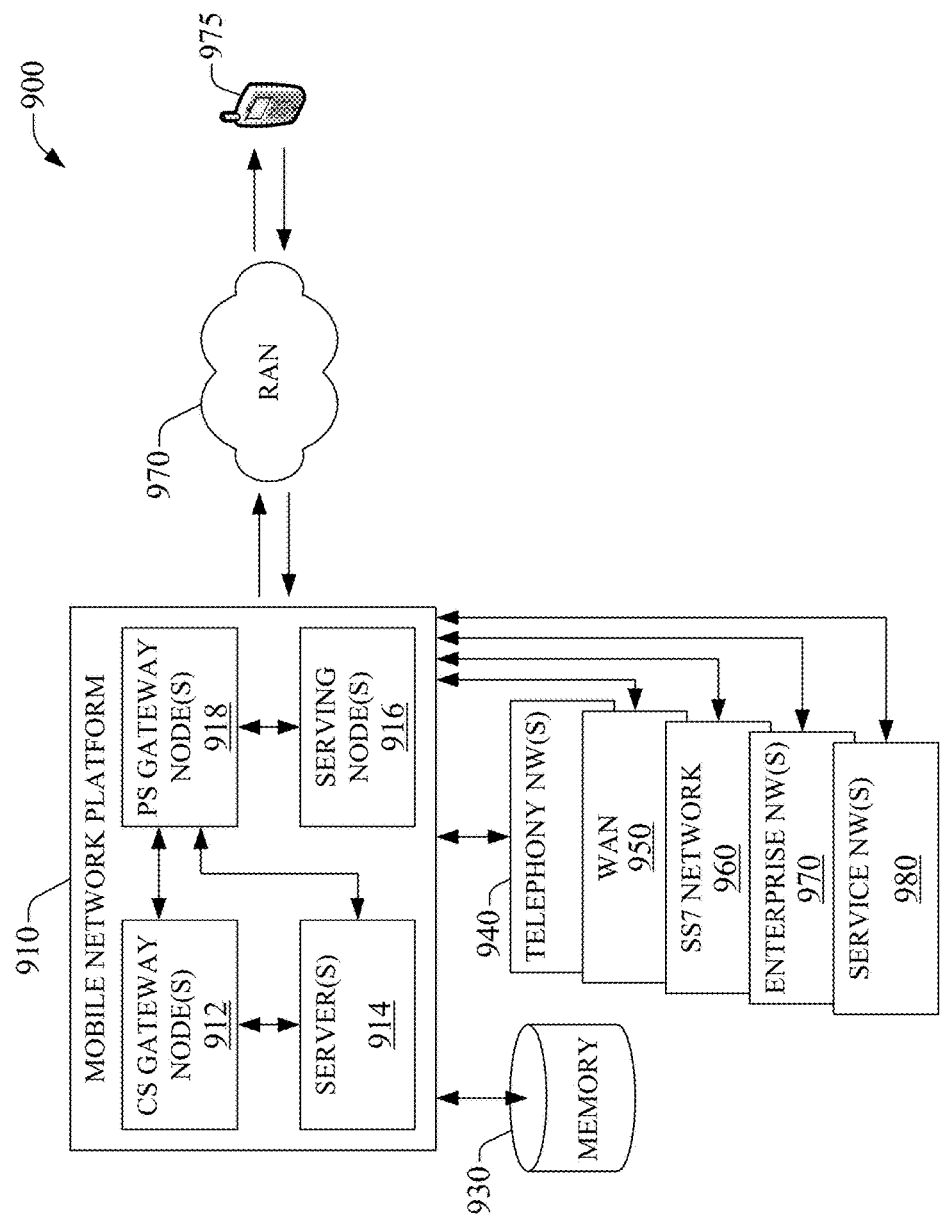
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network, including telecommunications carrier networks employing timed fingerprint location environments. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS).

Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows, including selection of RAT resources for communicating data, wherein selection includes the consideration of historical information relating to the RAT resources. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
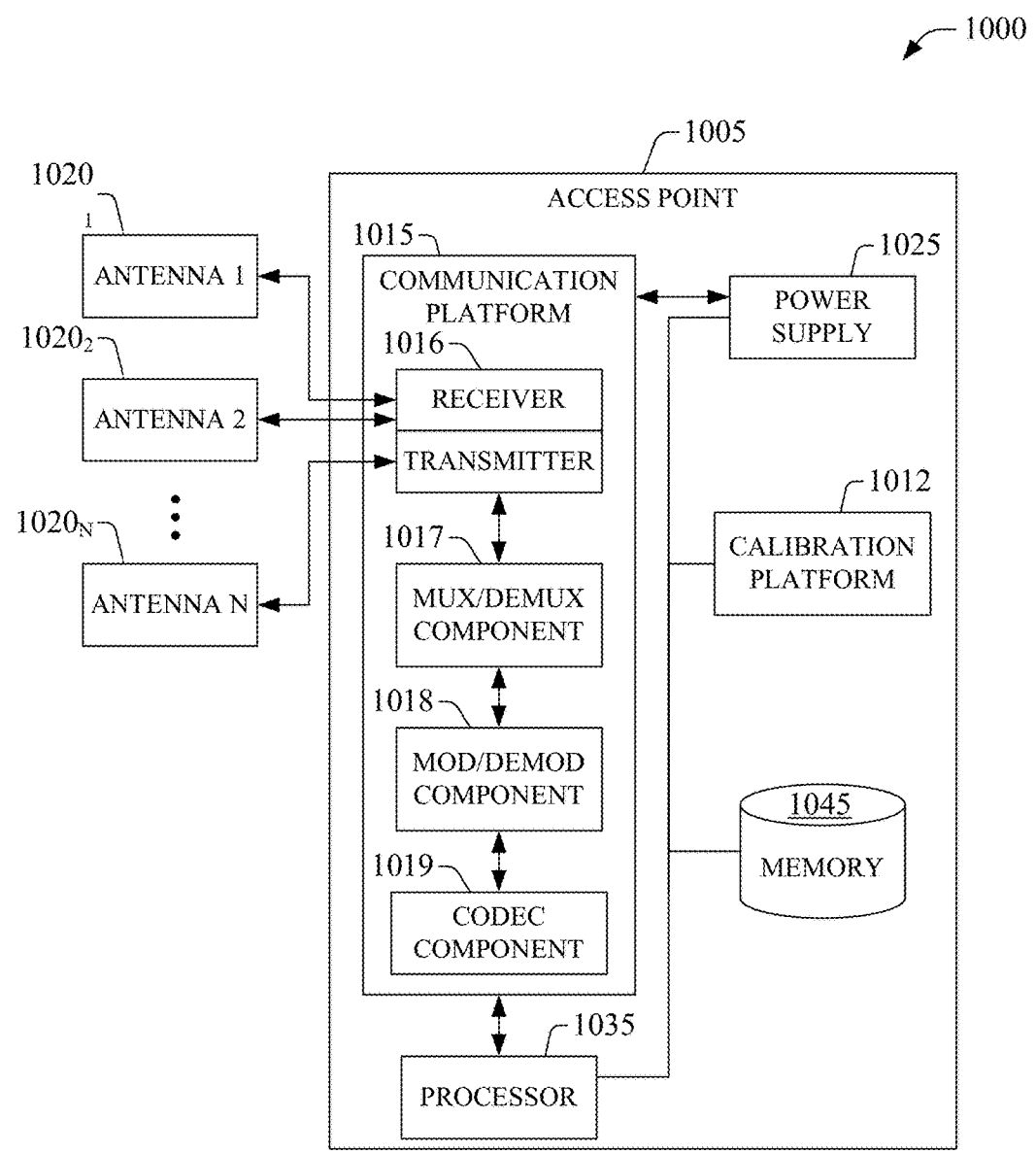
FIG. 10 illustrates a block diagram of an exemplary embodiment of an access point to implement and exploit one or more features or aspects of the subject disclosure.

FIG. 10 illustrates a block diagram of an example embodiment of an access point to implement and exploit one or more features or aspects of the subject innovation. Access point 1000 can be part of a communications framework, for example, a femtocell (e.g., 508, 608), a microcell, a picocell, a router, a wireless router, etc. In embodiment 1000, AP 1005 can receive and transmit signal(s) (e.g., attachment signaling) from and to wireless devices like femtocell access points, access terminals, wireless ports and routers, or the like, through a set of antennas $1020_1$-$1020_N$ (N is a positive integer). It can be noted that antennas $1020_1$-$1020_N$ can be part of communication platform 1015, which comprises electronic components and associated circuitry that provides for processing and manipulation of received electromagnetic signal(s) and electromagnetic signal(s) to be transmitted. Such electronic components and circuitry embody, at least in part, can comprise signaling and traffic components within a communication framework. In some embodiments, communication platform 1015 can include a receiver/transmitter 1016 that can convert signal from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 1019 that facilitates decoding received signal(s), and coding signal(s) to convey.

Access point 1005 can also include a processor 1035 configured to confer functionality, at least in part, to substantially any electronic component in AP 1005. Power supply 1025 can attach to a power grid and include one or more transformers to achieve a power level that can operate AP 1005 components and circuitry. Additionally, power supply 1025 can include a rechargeable power component to ensure operation when AP 1005 is disconnected from the power grid, or in instances, the power grid is not operating.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus, to calibration platform 1012 and other components (not shown) to confer, at least in part functionality to each of such components.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
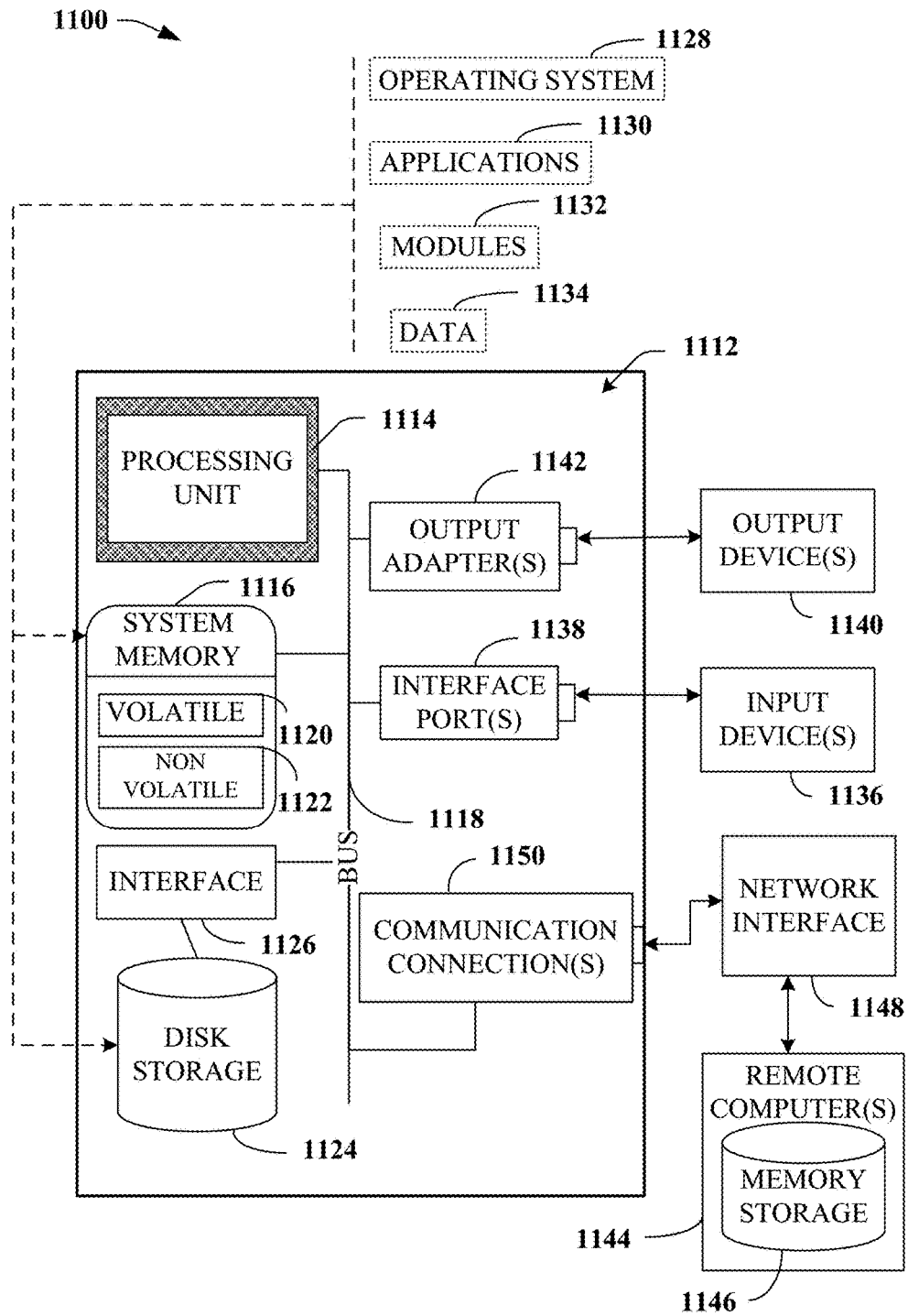
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1120, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of a RAT selection component or timed fingerprint location component, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126. For example, disk storage 1124 can store one or more TFL lookup tables facilitating lookup of location information based on NodeB site pairs and time values, historical information associated with a RAT resource, contemporaneous RAT resource parameters, RAT resource selection rules or algorithms, etc.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128 (e.g., OS component(s) 312, etc.) Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      determining a rank order of radio access resources based on historical performance data associated with the radio access resources, wherein the radio access resources comprise a first radio access resource and a second radio access resource, wherein the first radio access resource employs a first radio access technology and the second radio access resource employs a second radio access technology that is different from the first radio access technology, and wherein the historical performance data comprises first historical performance data associated with the first radio access resource and second historical performance data associated with the second radio access resource; and
      facilitating establishment of a wireless link between a user equipment and the first radio access resource based on the rank order of the radio access resources.

2. The device of claim 1, wherein the historical performance data is based on a location of the user equipment.

3. The device of claim 2, wherein the location is an inferred future location of the user equipment.

4. The device of claim 3, wherein the inferred future location is inferred from a current location of the user equipment and a speed of the user equipment.

5. The device of claim 4, wherein the speed of the user equipment is determined from historical user equipment location information.

6. The device of claim 3, wherein the inferred future location is further inferred from map data.

7. The device of claim 6, wherein the map data comprises geographical roadway information.

8. The device of claim 3, wherein the facilitating the establishment of the wireless link occurs at an inferred future time associated with the user equipment being expected to be within a coverage area of the first radio access resource.

9. The device of claim 7, wherein the inferred future time is inferred from a current location of the user equipment, a speed of the user equipment, and map data representative of a map encompassing an area comprising the location of the user equipment.

10. A method, comprising:
    determining, by a system comprising a processor, a preferred radio access resource based on historical performance data associated with radio access resources comprising the preferred radio access resource, wherein:
       the radio access resources comprise a preferred radio access resource and a non-preferred radio access resource,
       the preferred radio access resource employs a first radio access technology and the non-referred radio access resource employs a second radio access technology that is different from the first radio access technology, and
       the historical performance data comprises first historical performance data associated with the preferred radio access resource and second historical performance data associated with the non-preferred radio access resource; and
    facilitating, by the system, attempting to establish a connection between a user equipment and the preferred radio access resource based on the historical performance data.

11. The method of claim 10, wherein the facilitating the attempting comprises signaling an activation a radio of the user equipment, and wherein the radio supports the first radio access technology.

12. The method of claim 11, wherein the signaling the activation comprises indicating a time value related to a forecast time of entry of the user equipment into a wireless coverage area of the preferred radio resource.

13. The method of claim 12, wherein the forecast entry is inferred from historical motion information associated with the user equipment and transportation route data.

14. The method of claim 11, wherein the signaling the activation comprises indicating a future location of the user equipment, and wherein the future location is inferred from historical motion information associated with the user equipment and transportation route data.

15. A method, comprising:
    determining, by a system comprising a processor, a rank order of radio access resources based on historical performance data associated with the radio access resources, wherein:
       the radio access resources comprise a first radio access resource, a second radio access resource, and a third radio access resource,
       the first radio access resource employs a first radio access technology, the second radio access resource employs a second radio access technology that is different from the first radio access technology, and the third radio access resource employs a third radio access technology that is different from the first radio access technology and the second radio access technology, and
       the historical performance data comprises first historical performance data associated with the first radio access resource, second historical performance data associated with the second radio access resource, and third historical performance data associated with the third radio access resource;

transitioning, by the system, a first state of a first radio of a user equipment based on the rank order of the radio access resources, wherein the first radio employs the first radio access technology; and transitioning, by the system, a second state of a second radio of the user equipment based on the rank order of the radio access resources, wherein the second radio employs the second radio access technology.

16. The method of claim 15, wherein the transitioning the first state and the transitioning the second state occur contemporaneously.

17. The method of claim 15, wherein the transitioning the first state activates the first radio.

18. The method of claim 15, wherein the transitioning the first state deactivates the first radio.

19. The method of claim 15, wherein the transitioning the second state activates the second radio.

20. The method of claim 15, wherein the transitioning the second state deactivates the second radio.

* * * * *